(No Model.)
W. DOUGHERTY.
FAUCET.
No. 352,048. Patented Nov. 2, 1886.
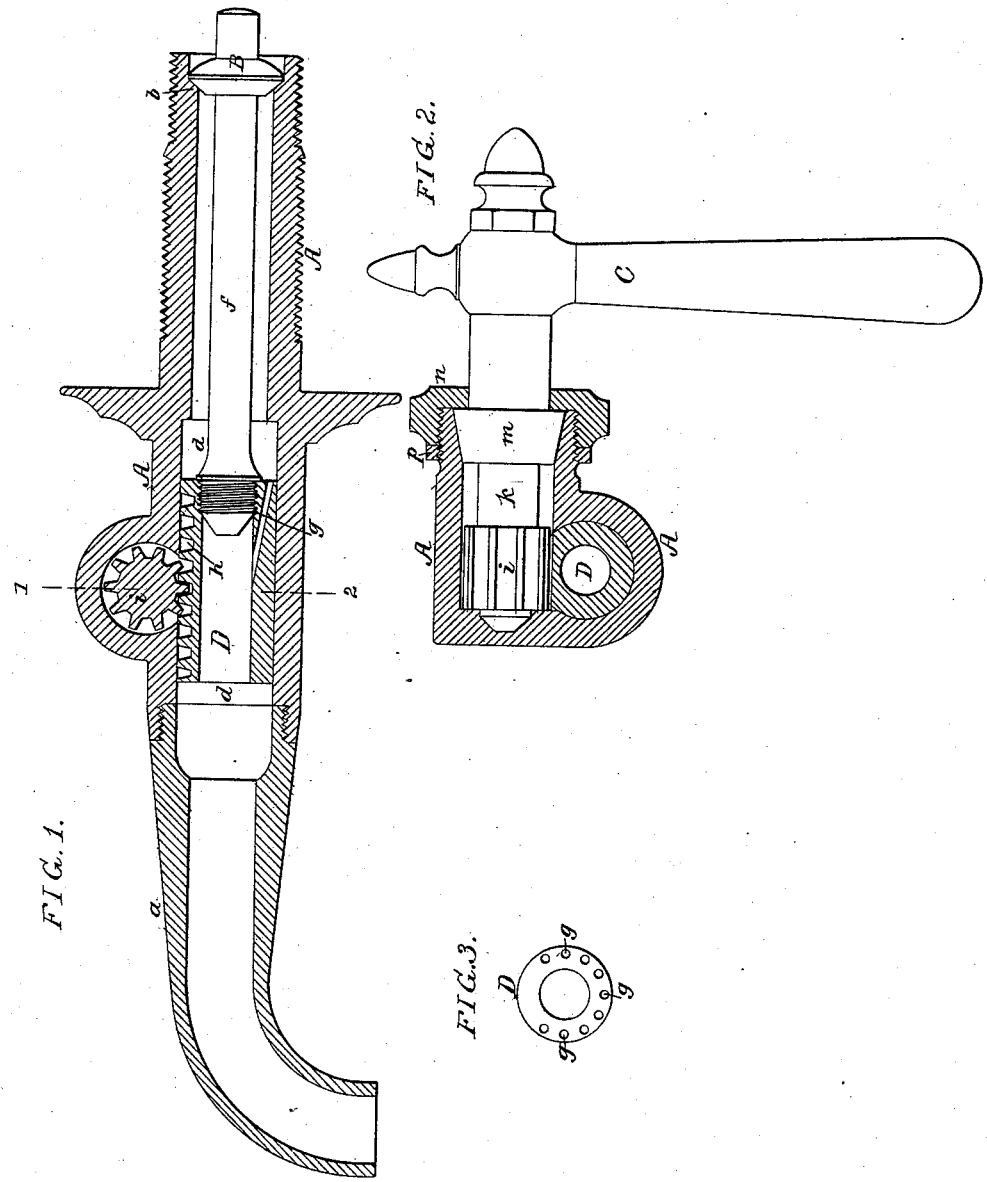
Witnesses:
Harry Drury
John M. Clayton
Inventor
William Dougherty
by his attorneys
Howson & Sons

UNITED STATES PATENT OFFICE.

WILLIAM DOUGHERTY, OF PHILADELPHIA, PENNSYLVANIA.

FAUCET.

SPECIFICATION forming part of Letters Patent No. 352,048, dated November 2, 1886.

Application filed August 4, 1884. Serial No. 139,577. (No model.)

*To all whom it may concern:*

Be it known that I, WILLIAM DOUGHERTY, a citizen of the United States, and a resident of Philadelphia, Pennsylvania, have invented certain Improvements in Faucets, of which the following is a specification.

My invention relates to that class of faucets in which a guided stem carries a valve adapted to a seat in the casing, the stem being operated by a rack and pinion or equivalent mechanism to open and close the valve.

The object of my invention is to so construct a faucet of this class as to insure the accurate guidance of the valve, to prevent the clogging of the operating-gearing or leakage around the operating-stem, and to permit the ready removal of the guide and operating-gearing without disturbing the valve.

In the accompanying drawings, Figure 1 is a longitudinal section of my improved faucet, the valve and its stem being in elevation; Fig. 2, a transverse section on the line 1 2 with the valve-operating device in elevation, and Fig. 3 an end view of the valve-guide.

A is the casing of the faucet, threaded at one end for being screwed into a keg or other receptacle of liquid, and having at the opposite end a detachable discharge-branch, $a$, curved, as usual. The valve comprises the disk or button B, adapted to a seat, $b$, near the inlet end of the casing A, a tubular guide, D, fitted snugly, but so as to slide freely in the counterbored portion $d$ of the casing, being connected to the valve by the stem $f$, which is secured to or forms part of the disk B, and has a threaded end adapted to an internally-threaded opening in the guide D. The guide thus serves to steady the valve B and insure the parallel movement of the same to and from its seat.

When the valve is opened, the liquid passes through the casing and through a series of inclined openings, $g$, in the tubular guide to the interior of the latter, and from thence to the discharge-branch $a$ of the faucet, the openings $g$ being of contracted area, so as to serve as strainers for the liquid.

The guide D has in the top a rack, $h$, into which gears a spur-wheel, $i$, on a spindle, $k$, the latter having an end bearing in the casing A, and being provided with a tapering collar, $m$, adapted to a seat in the casing, to which it is confined by a screw-cap, $n$, a jam-nut, $p$, bearing on the latter. The outer end of the spindle has an operating-handle, G, by which it can be readily manipulated in order to open or close the valve.

The gearing for operating the valve is not exposed to the action of the liquid flowing through the casing, the guide D fitting snugly to the bore $d$ of the casing, so as to prevent the access of the liquid to the gearing.

On removing the discharge-branch $a$ the guide D can be readily unscrewed from the end of the valve-stem $f$ and removed from the casing for cleansing or repairs, the flow of liquid through the casing being prevented by the valve B, which remains seated at the inner end of said casing.

I claim as my invention—

1. The combination of the casing having a valve-seat at the inner end, a discharge-branch at the outer end, and a bore between the two, the valve and its stem, the hollow guide forming a passage for the liquid, said guide being connected to the valve-stem and fitted to and contained wholly within the bore of the casing between the valve and the discharge-branch, and operating-gearing acting on the outer periphery of the hollow guide, behind the front end of the same, and contained mainly within the casing, but having a stem projecting therefrom, all substantially as specified.

2. The combination of the valve-casing having a valve-seat at the inner end, a detachable discharge-branch at the front end, and a bore between the two, the valve adapted to the valve-seat at the inner end of the casing and having a projecting stem, and a hollow guide screwed onto the front end of said stem and adapted to the bore of the casing between the valve and the discharge-branch, whereby on detaching the discharge-branch the hollow guide can be removed from the casing without disturbing the valve, all substantially as specified.

In testimony whereof I have signed my name to this specification in the presence of two subscribing witnesses.

WILLIAM DOUGHERTY.

Witnesses:
JOHN M. CLAYTON,
HARRY SMITH.